(12) United States Patent
Chase et al.

(10) Patent No.: US 7,777,977 B2
(45) Date of Patent: Aug. 17, 2010

(54) FLAME SCANNER COLLIMATOR BODY

(75) Inventors: Paul H. Chase, Suffield, CT (US); William M. Clark, III, Windsor, CT (US); Pio Joseph Fusco, Wethersfield, CT (US)

(73) Assignee: ALSTOM Technology Ltd (CH)

( * ) Notice: Subject to any disclaimer, the term of this patent is extended or adjusted under 35 U.S.C. 154(b) by 229 days.

(21) Appl. No.: 12/033,542

(22) Filed: Feb. 19, 2008

(65) Prior Publication Data

US 2009/0207510 A1 Aug. 20, 2009

(51) Int. Cl.
*G02B 7/02* (2006.01)
(52) U.S. Cl. ........................................... 359/820
(58) Field of Classification Search ......... 359/809–811, 359/819, 820; 250/554; 340/577, 578
See application file for complete search history.

(56) References Cited

U.S. PATENT DOCUMENTS 5,521,697 A * 5/1996 Stavinoha .................. 356/44

6,370,486 B1 4/2002 Sivathanu
7,289,032 B2 10/2007 Seguin et al.

FOREIGN PATENT DOCUMENTS

| DE | 4332044 | 3/1995 |
| GB | 865140 | 4/1961 |
| WO | 2006091617 A1 | 8/2006 |

OTHER PUBLICATIONS

Partial International Search Report of the International Searching Authority, dated May 3, 2010 - (PCT/US2009/031988).

* cited by examiner

*Primary Examiner*—Joseph Martinez
(74) *Attorney, Agent, or Firm*—Cantor Colburn LLP

(57) ABSTRACT

A flame scanner collimator, which monitors flames produced by a fossil fuel fired combustion chamber, includes: a substantially cylindrical collimator body defining a hollow portion; a first chamber connected to a second chamber, the first and second chambers defining the hollow portion, the second chamber having a larger diameter than the first chamber; and a plurality of slots each extending in substantially a same direction as a longitudinal axis defining the body. Each slot extends through the body to the first and second chambers to allow cooling/purge air flow therethrough.

20 Claims, 6 Drawing Sheets

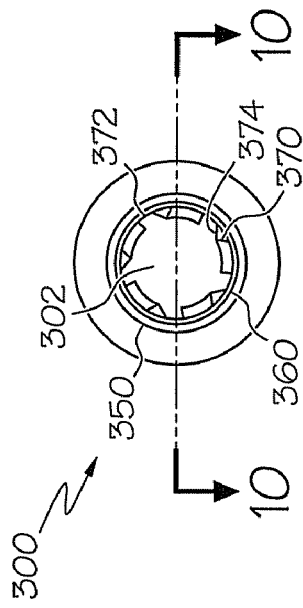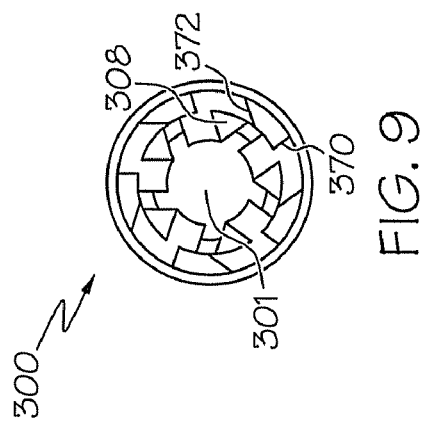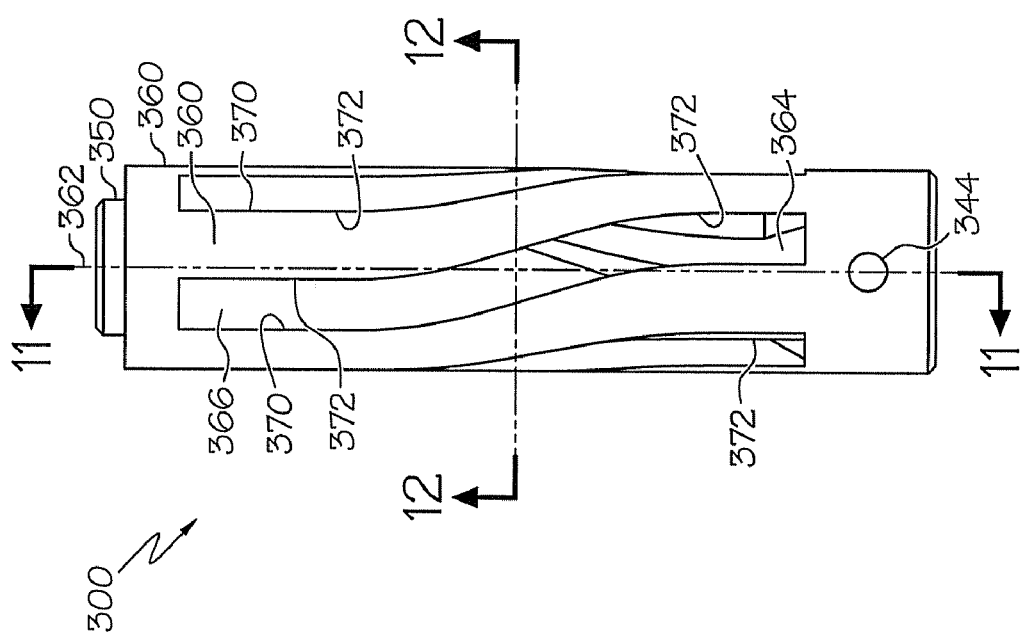

FLAME SCANNER COLLIMATOR BODY

TECHNICAL FIELD

The present invention is related to a flame scanner collimator body of a flame scanner for monitoring flames produced in a fossil fuel fired combustion chamber, and more particularly to such a flame scanner collimator body for new and retrofit applications that ensures that a lens barrel assembly disposed therein receives adequate airflow and remains properly attached to a fiber optic cable, to indicate both the presence and characteristics of a flame.

BACKGROUND

A flame scanner monitors the combustion process in a fossil fuel fired combustion chamber to provide a signal indicating the presence or absence of a stable flame. With the presence of a stable flame, fossil fuel continues to be fed into the combustion chamber of the steam generator. In the event that the flame becomes unstable, or the flame is lost completely (known as a flame out condition), the flame scanner provides a loss of flame signal. Based upon a loss of flame signal, fossil fuel delivery to the combustion chamber can be discontinued before an undesirable unstable operating condition or flame out condition develops. In some systems, a human operator interrupts the fuel supply based upon the loss of flame signal; in other systems a burner management system (BMS) interrupts the fuel supply based upon the loss of flame signal.

Conventional flame scanners produce an electrical signal based upon a monitored flame. This resulting analog electrical signal is transmitted to processing electronics that are housed separately from the flame scanner, typically in an equipment rack located adjacent to a control room. The strength of the produced signal is typically proportional to the intensity of the monitored flame. If the signal strength falls below a lower set point, or rises above an upper set point, delivery of main fuel into the combustion chamber is interrupted. Set points are sometimes referred to as trip points.

A flame scanner collimator body is a housing that shields optical components that gather light from burner flames. The optics within this housing focuses the light from the burner flames on a transmission medium, such as a fiber optic cable, to transmit the light for flame analysis outside a combustion chamber of the boiler away from the hot burner zone. More specifically, one end of the fiber optic cable terminates in a fixed lens barrel assembly disposed within the collimator body. However, there are problems associated with existing collimator bodies.

For example, the lens barrel assembly is fixed to the collimator body using a plurality of screws. There is no relief of tension on the cable fibers of the fiber optic cable if there is any tension between the cable and lens barrel assembly. This tension breaks delicate fibers thus reducing the light transmission to the flame intensity and frequency analysis circuitry outside the boiler.

Conventional lens barrel assemblies include relatively large lens barrels disposed within the collimator body. However, large lens barrels reduce the cooling airflow through the collimator body, which causes excessive heat build up between the junction of the lens barrel and the fiber optic cable. Excessive heat causes the bonding material that holds the fibers in place to weaken, thus causing the fibers to pull back from the end of the cable and retreat from the lens barrel focal point thereby reducing the light power transmission therethrough.

All hardware in the field environment where the flame scanner resides requires maintenance at one time or another. Therefore, the collimators are commonly disassembled and reassembled when the occasion arises requiring parts cleaning or replacement. However, the typical field repair/cleaning takes place on a hot collimator where each collimator is typically assembled using four (4) to seven (7) hex head set screws and the technician is wearing gloves and/or standing over floor grating, thus presenting a greater risk of loosing the screws. Some of these set screws hold the lens barrel assembly in the collimator body as discussed above.

Lastly, the relatively large lens barrel disposed within the collimator tube creates a large pressure drop that restricts cooling/purge airflow over the lens. The result is that dust born in the cooling airflow deposits on the lens over time much like dirt depositing on the rear window of an SUV or station wagon.

Accordingly, a need exists for a flame scanner collimator body that has a reduced parts count to reduce assembly cost and provide for easier maintenance. A need also exists for a collimator body that has a mechanically rugged design for increased protection of internal components and that improves cooling/purge airflow to improve cleaning action on a lens barrel lens.

SUMMARY

According to the aspects illustrated herein, there is provided a flame scanner collimator for monitoring flames produced by a fossil fuel fired combustion chamber. The flame scanner collimator includes: a substantially cylindrical collimator body defining a hollow portion; a first chamber connected to a second chamber, the first and second chambers defining the hollow portion, the second chamber having a larger diameter than the first chamber; and a plurality of slots each extending in substantially a same direction as a longitudinal axis defining the body. Each slot extends through the body to the first and second chambers to allow cooling/purge air flow therethrough.

According to the other aspects illustrated herein, there is provided a flame scanner collimator for monitoring flames produced by a fossil fuel fired combustion chamber. The flame scanner collimator includes: a substantially cylindrical collimator body defining a hollow portion; a first chamber connected to a second chamber, the first and second chambers defining the hollow portion, the second chamber having a larger diameter than the first chamber; a lens barrel assembly slidably disposed in the first chamber of the collimator body; and a biasing member disposed in the second chamber biasing the lens barrel assembly away from the second chamber.

The above described and other features are exemplified by the following figures and detailed description.

BRIEF DESCRIPTION OF THE DRAWINGS

Referring now to the figures, which are exemplary embodiments, and wherein the like elements are numbered alike:

FIG. 7 is a elevation view of a collimator body of the lens assembly of FIG. 4 in accordance with an embodiment of the present invention.

FIG. 8 is an enlarged top plan view of the collimator body of FIG. 7.

FIG. 9 is an enlarged bottom plan view of the collimator body of FIG. 7.

DETAILED DESCRIPTION

Figure 1:
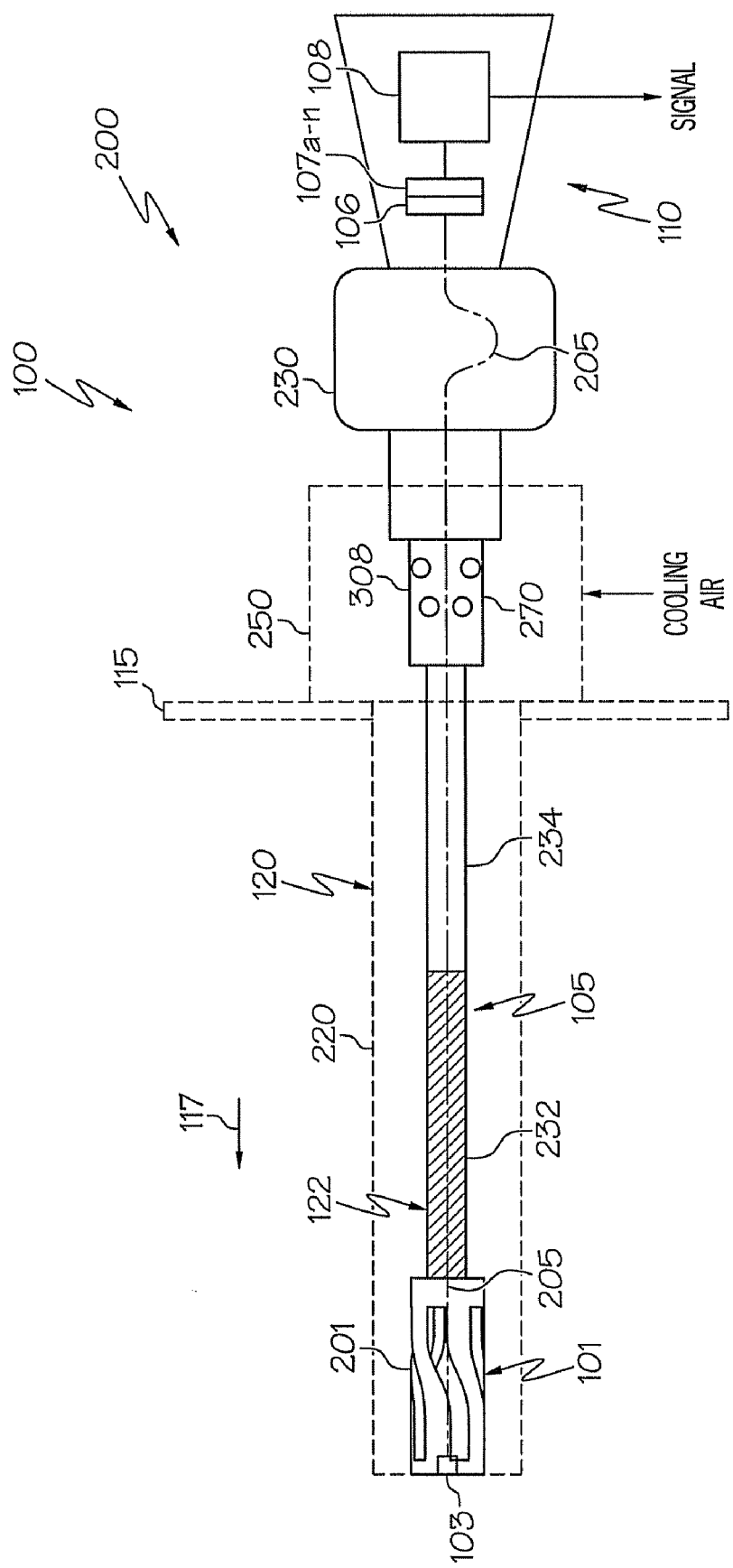
FIG. 1 is a simplified schematic depiction of a flame scanner assembly having a collimator in accordance with an embodiment of the present invention.

With reference to the Figures, and particularly to FIG. 1, included in a flame scanner assembly 100 of the present invention are a flame scanner 200 and a guide pipe assembly 120, which secures the flame scanner 200 to wall 115 of a combustion chamber. The flame scanner 200 includes a lens assembly 101, a fiber optic cable assembly 105, a spool assembly 230, and a detector head assembly 110. The guide pipe assembly 120 includes a guide pipe 220, which extends within the combustion chamber 117, and a manifold coupling 250, which is disposed outside the combustion chamber 117 and is attached to wall 115. The detector head assembly 110 and the spool assembly 230 are mounted to the outside wall 115 by the manifold coupling 250, while the lens assembly 101 is positioned inside the guide pipe 220 within the combustion chamber 117. The fiber optic cable assembly 105 extends within the guide pipe 220 and manifold coupling 250 to connect the spool assembly 230 and detector head assembly 110 to the lens assembly 101 through the outside wall 115. Preferably, all metal components of the lens assembly 101 and the fiber optic cable assembly 105 that are subjected to high heat are constructed of type 304 stainless steel. Flame scanner 100 may be, as desired, utilized in either tangential fired (T-fired) or wall-fired boilers, as well as used with any, or all of, coal-, oil-, gas-, and/or other fuel-fired burners.

The lens assembly 101 includes a replaceable quartz lens 103. The fiber optic cable assembly 105 includes a fiber optic cable 205 that extends from the lens 103, through the lens assembly 101 and through a protective sleeve 122 that connects the lens assembly 101 to the spool assembly 230 and detector head assembly 110. The protective sleeve 122 is made of a material suitable to protect the fiber optic cable 205 from the environmental conditions within the combustion chamber 117. In the embodiment shown, protective sleeve 122 is made of a steel flex hose 232 and a steel pipe 234 connected to the flex hose 232. It will be appreciated, however, that the protective sleeve 122 may be made of any material that protects the fiber optic cable 205 from environmental conditions within the combustion chamber 117. The flex hose 232 in turn is coupled to a collimator 201, which houses the lens. The fiber optic cable 205 transmits light collected by the quartz lens to a splitter 106 located inside the detector head assembly 110. Quartz or other cables may be utilized, as desired.

In this embodiment, the splitter 106 directs the collected light onto each of multiple photodiodes 107a-107n. Preferably, six photodiodes are utilized, however, fewer or more photodiodes could be utilized, as desired. Each photodiode 107a-107n converts light energy into an electrical signal. Each electrical signal is then sent to an onboard digital signal processor 108. Use of an onboard digital signal processor 108 replaces the separate and remote processing electronics of conventional flame scanners. However, conventional flame scanners with remote signal processing would be an acceptable option. In any case, the flame scanner 200 may output a signal indicative of a condition of the flame in combustion chamber 117.

The manifold coupling 250 receives air from an external source, and internal channels within the manifold coupling 250 direct the air to apertures 308 disposed within a mounting shaft 270, which is attached to the end of the sleeve 122. This air passes through the apertures 308 and through the sleeve 232 to the lens assembly 101 to cool the fiber optic cable 205 and clean the lens 103 from debris. Air from the manifold coupling 250 may also pass between the guide pipe 220 and fiber optic cable assembly 105 for cooling and cleaning purposes.

The spool assembly 230 has a chamber disposed therein for receiving one or more coils, or other excess amount, of fiber optic cable 205. The mounting shaft 270 is slidably received within one end of the spool assembly 230 and may be pushed axially into, or pulled axially outward from, the spool assembly 230, thereby adjusting the length of the flame scanner 200. The spool assembly 230 receives excess fiber optic cable 205 when the flame scanner 200 is shortened, and the excess fiber optic cable 205 in the spool assembly 230 provides sufficient cable 205 for lengthening of the flame scanner 200. Once the desired length is achieved, the mounting shaft 270 may be locked in place relative to the spool assembly 230 to fix the flame scanner 200 length. This "telescopic" adjustment in flame scanner 200 length allows for variations in flame scanner length due to loose manufacturing tolerances or poor documentation, while still achieving a proper fit up in the field.

Figure 2:
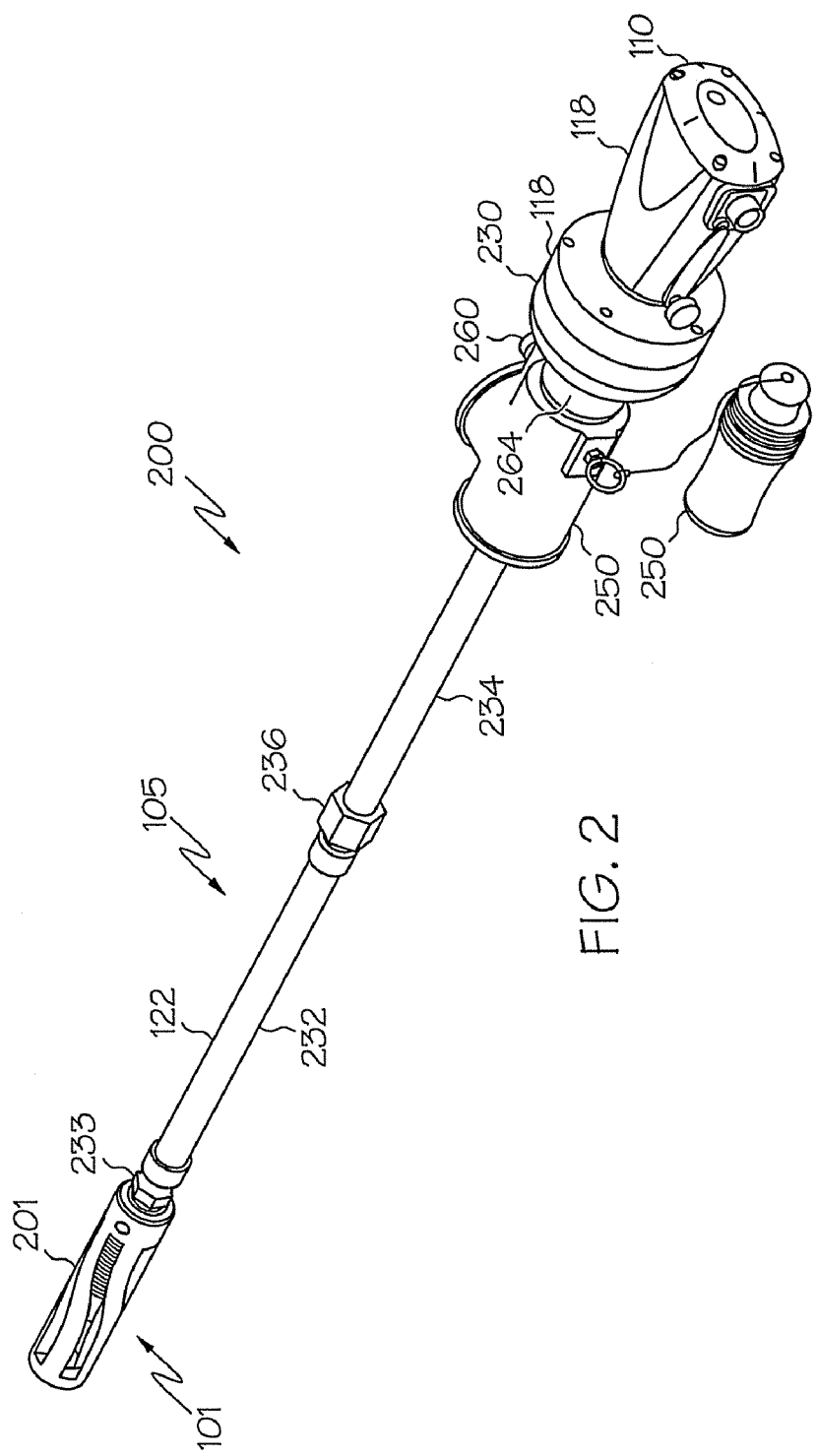
FIG. 2 is a side elevation view and more detailed view of the flame scanner of FIG. 1 removed from a guide pipe and boiler and having a lens assembly connected to head and spool assemblies via a fiber optic cable assembly.

FIG. 2 is a perspective side view and more detailed view of the flame scanner 200 of FIG. 1 removed from the boiler and having the lens assembly 101 connected to a fiber optic cable scanner head assembly 118 via the fiber optic cable assembly 105 in accordance with an embodiment of the present invention. The fiber optic cable scanner head assembly 118 includes spool and detector head assemblies 230 and 110, respectively, connected to the fiber optic cable assembly 105, respectively. The lens assembly 101 includes the collimator 201 which houses a lens (not shown in FIG. 2) that couples the light energy from the burner flame into a high temperature fiber optic cable (not shown) of the fiber optic cable assembly 105.

On tilting tangential boilers, the fiber optic cable assembly 105 allows the scanner 200 to tilt with the corner so that the scanner always has a clear view of the fireball or oil gun. On wall fired units, the fiber optic cable assembly 105 allows the scanner lens to have an unobstructed view of the flame allowing for unsurpassed flame discrimination under all operating conditions.

In an exemplary embodiment, for example, but is not limited thereto, the fiber optic cable (not shown) is a fiber optic bundle encapsulated in a stainless steel overbraid flex cable (not shown). The fiber optic cable is disposed within the protective sleeve 122, which may comprise a ½ inch outer stainless steel flex hose 232 connected to the collimator 201 via an NPT adapter (not shown) and a locknut 233, and a ½ inch schedule 40 pipe 234 connected to the flex hose 232 using a coupling nut 236. The pipe 234 is connected to the spool assembly 230.

Figure 3:
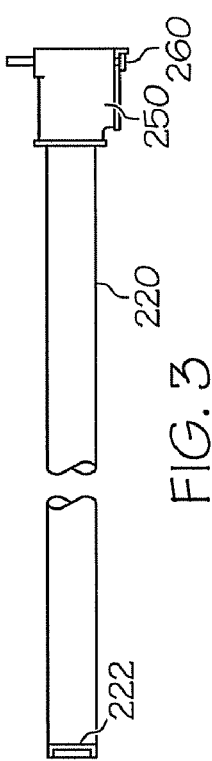
FIG. 3 is a side elevation view of one embodiment of a guide pipe and cooling air manifold coupling to receive the flame scanner of FIG. 2.

Installation of the flame scanner 200 is accomplished by first inserting the collimator 201 defining the lens assembly 101 down a guide pipe 220 as illustrated in FIG. 3 which is installed through the windbox or boiler wall 115. On wall fired burners, a rigid guide pipe 220, as shown in FIG. 3, may be used instead of a flexible guide pipe. However, on titling tangential boilers a flexible guide pipe (not shown) is used to support the corner tilts. FIG. 3 illustrates the guide pipe 220 mounted to a cooling air manifold coupling assembly 250 for coupling directly with the spool assembly 230, without the use of any adapter therebetween.

The cooling air manifold coupling 250 of FIG. 3 includes at least one pull pin 260 for securing the flame scanner 200 within the guide pipe 220 once installed therein. In addition, the guide pipe 220 of FIG. 3 includes a guide 222 configured to receive the end of the collimator 201 to properly seat the collimator 201 into the correspondingly shaped guide 222 at the end of the guide pipe 220 at the boiler side. The pull pin 260 is received in a corresponding aperture (not shown) disposed in a barrel 264 defining one end of the spool assembly 230 (FIG. 2). In exemplary embodiments, two pull pins 260 are employed.

Figure 4:
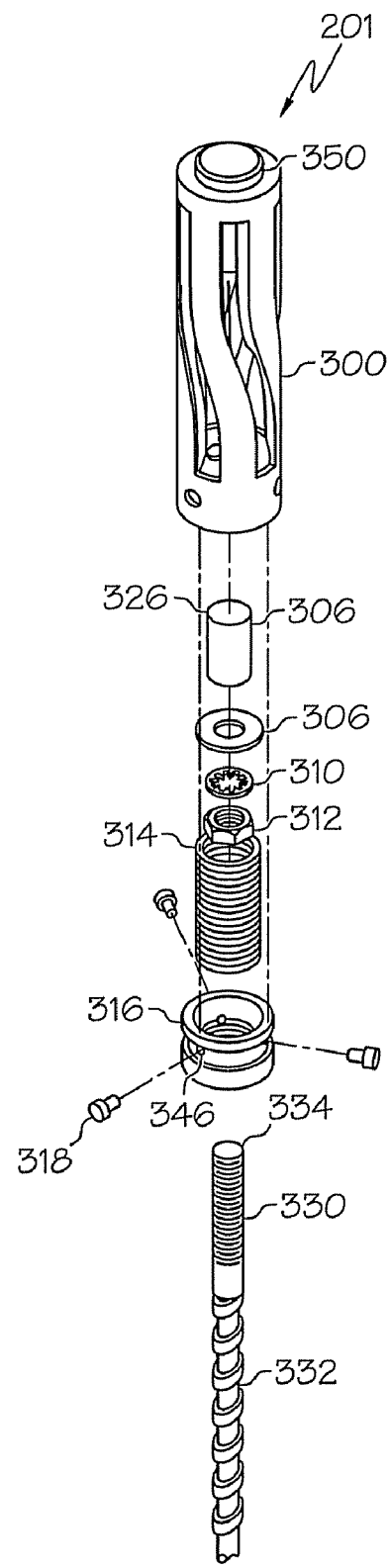
FIG. 4 is an exploded perspective view of the lens assembly of FIG. 1 in accordance with an embodiment of the present invention.

Referring to FIG. 4, an exploded perspective view of the collimator 201 is illustrated. The collimator 201 includes a collimator body 300 having a first chamber 302 and a second chamber 304 (best seen with reference to FIG. 10). The second chamber 304 is a larger diameter chamber than the first chamber 302 discussed more fully hereinbelow. The collimator 201 further includes a lens barrel assembly 306 slidably disposed in the first chamber 302 of the collimator body. Still referring to FIG. 4, the collimator 201 further includes a flat washer 308, lock washer 310, locknut 312, biasing member 314, NPT adapter 316 and set screws 318 to retain the NPT adapter 316 with a bottom portion of the collimator body 300 corresponding with the larger diameter second chamber 304. In an exemplary embodiment as illustrated, the biasing member 314 is a compression spring 314.

Figure 6:
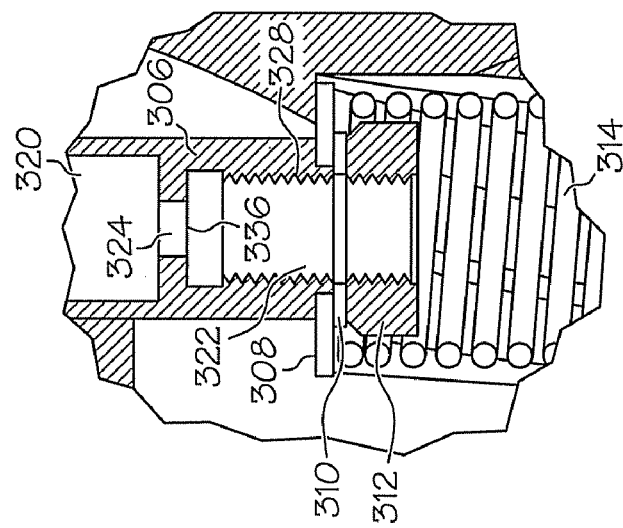
FIG. 6 is an enlarged partial view of the circled portion of the lens assembly in FIG. 5.
Figure 5:
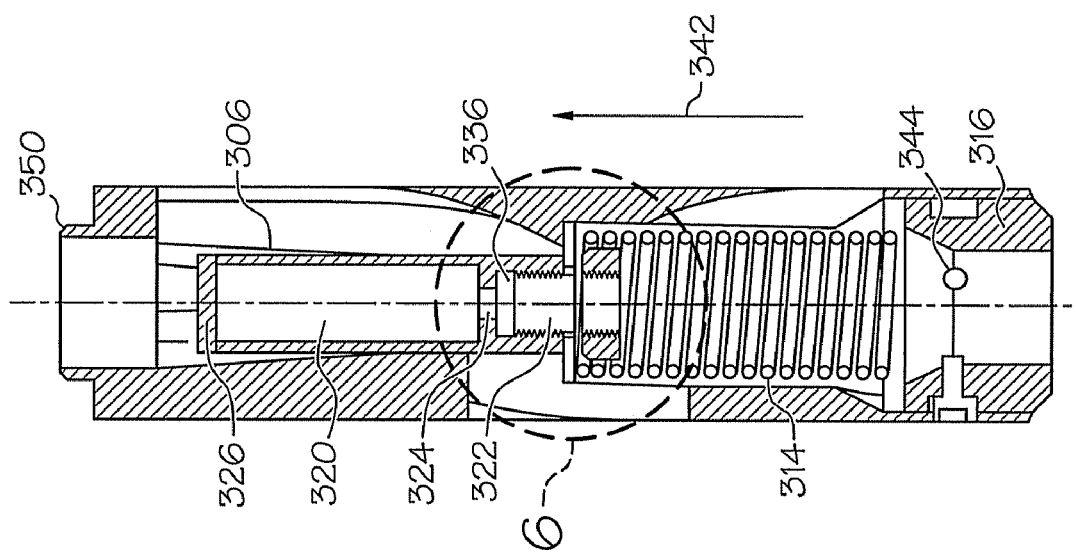
FIG. 5 is a cross section view of an exemplary embodiment of the lens assembly of FIG. 4 in accordance with an embodiment of the present invention.

Referring to FIGS. 4-6, the lens barrel assembly 306 includes a first chamber 320 connected to a smaller diameter second chamber 322 via even a smaller third chamber 324 therebetween the first and second chambers 320 and 322. A lens 326 is disposed at one end of the lens barrel assembly 306 corresponding with the first chamber 320. An opposite end of the lens barrel assembly 306 corresponds to the second chamber 322 in which at least a portion thereof includes threads 328 (best seen in FIG. 6) to engage corresponding threads 330 at one end of a fiber optic cable 332. The fiber optic cable 332 is threaded into the second chamber 322 until an end 334 of the threaded end of the cable 332 abuts a corresponding end 336 (see FIG. 5) of the second chamber 322, thereby forming a proper focal point distance from the lens 326.

Still referring to FIGS. 4-6, assembly of the collimator 201 will be described. The fiber optic cable 332 may be disposed through the spring 314 and NPT adapter 316, but may be installed afterwards if an opposite end of the fiber optic cable 332 is not connected to the fiber optic cable scanner head assembly 118. The threaded locknut 312 is threaded onto the corresponding threads 330 at the one end of the fiber optic cable 332. The lock washer 310 and flat washer 308 are then respectively disposed over the corresponding threads 330 at the one end of the fiber optic cable 332 before threading the one end of the fiber optic cable 332 into the threads 328 of the second chamber 322 until the end 334 of the threaded end of the cable 332 abuts the corresponding end 336 of the second chamber 322, thereby forming a proper focal point distance from the lens 326 disposed at an opposite end of the lens barrel assembly 306. In an exemplary embodiment, the lock washer 310 is toothed radially inwardly, but is not limited thereto. Then the locknut 312 is tightened down against one surface of the flat washer 308 to fix an opposite surface of the flat washer 308 against the lens barrel assembly 306.

The resulting assembly of the lens barrel assembly 306 and fiber optic cable 332 is then disposed in the collimator body 300 via the second chamber 304 until the flat washer 308 abuts a shoulder 340 defining an interface between the first and second chambers 302, 304. (See FIG. 10). The flat washer 308 includes an outside diameter which is larger than a diameter of the first chamber 302, larger than a diameter of the compression spring 314 and smaller than a diameter of the second chamber 304. In this manner, the flat washer 308 is slidably disposed within the second chamber 304. The flat washer 308 defines an aperture therethrough having a diameter larger than a diameter of the one end of the fiber optic cable 332 having threads 330. The diameter of the aperture defined by the flat washer 308 is also smaller than an outside diameter of a portion of the lens barrel assembly 306 defining the second chamber 322.

The spring 314 is disposed in the second chamber 304 having one end of the spring 314 abutting the flat washer 308 and an opposite end of the spring 314 abutting the NPT adapter 316. The NPT adapter 316 retains the spring 314 in the second chamber 304 and compresses the lens barrel assembly 306 in a direction indicated by arrow 342 (see FIG. 5) once secured in the second chamber 304 of the collimator body 300 via set screws 318 (three shown in FIG. 4). The set screws 318 are received through corresponding apertures 344 configured in the collimator body 300 and threaded into respective threaded holes 346 in the NPT adapter 316. A threaded portion at one end of the NPT adapter 316 receives a corresponding threaded end of the outer stainless steel flex hose 232 (FIG. 2).

The lens barrel assembly 306 is held in place with the spring 314. If tension occurs during operation of the scanner 200, the spring 314 allows tension release between the lens barrel assembly 306 and cable 332. A novel feature of the new collimator design described herein is that an exemplary embodiment of the collimator 201 holds the lens barrel assembly 306 in its center position relative to the stationary collimator body 300 during pull back, therefore keeping alignment with burner flame activity in the boiler to accurately indicate both the presence and characteristics of a flame.

Figure 10:
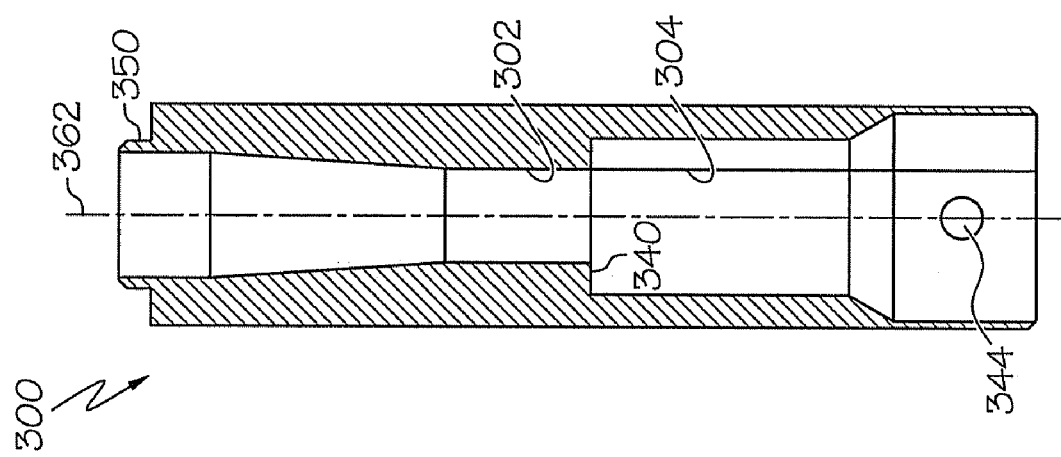
FIG. 10 is a simplified cross section view of the collimator body of FIG. 7 taken along line B-B of FIG. 8.

In an exemplary embodiment, the first chamber 302 of the collimator body 300 is configured having a diameter slightly larger than a diameter of the outside diameter of the lens barrel assembly 306. In this manner, the slightly larger diameter of the first chamber 302 allows slidable translation of the lens barrel assembly 306 therethrough while maintaining alignment of the lens barrel assembly 306 relative to the collimator body 300. In an exemplary embodiment as illustrated in FIGS. 5 and 10, the first chamber 302 diameter increases toward an end of the collimator body 300, thus providing a tapered diameter of the first chamber 302 as the first chamber 302 extends toward the end of the collimator body 300 having a guide cylinder 350 thereat. The guide cylinder 350 is received in the guide 222 of the guide pipe 220 (see FIG. 3). The increasing diameter at one end of the first chamber 302 enlarges the scope through the first chamber 302 for the lens barrel assembly 306 to compensate during pull back. In addition, the remaining portion of the first chamber 302 acts as a lens barrel guide for continued lens barrel sighting alignment during pull-back conditions.

In this manner, the lens barrel assembly 306 is slidably disposed in the first chamber 302 configured to allow translation of the lens barrel 306 in a direction opposite arrow 342. The lens barrel 306 translates in a direction opposite arrow 342 when the fiber optic cable 332 experiences tension on the cable fibers as a result of any tension between the cable 332 and lens barrel assembly 306. The compression spring 314 provides relief of this tension thus saving the integrity of the delicate fibers of the fiber optic cable 332 while maintaining the focal point distance between the lens 326 and the corresponding end 336 of the second chamber 322 of the lens barrel assembly 306, all while centering the lens barrel assembly 306 during any translation thereof.

Referring to FIGS. 7-11, the collimator body 300 will be described in more detail hereinbelow. FIG. 7 illustrates body 300 having a plurality of slots 360 each extending in substantially a same direction as a longitudinal axis 362 defining the body 300. Each of the plurality of slots 360 is substantially parallel with one another and the plurality of slots 360 circumvent a circumference defining the body 300. Each slot 360 extends through the body 300 from outside the body 300 to extend therethrough to the first and second chambers 302 and 304 to allow cooling/purge air flow therethrough. Each slot 360 includes a lower portion 364 which extends to an upper portion 366. The lower portion 364 of each slot 360 resides substantially on a right side of the longitudinal axis 362 while the upper portion 366 of each respective slot 360 resides substantially on a left side of the longitudinal axis 362. A junction or interface 368 between the lower and upper portions 364 and 366 crosses over the longitudinal axis 362 corresponding with the cross section line A-A in FIG. 7.

Each slot 360 is configured with such a nonlinear configuration relative to the longitudinal axis 362 to allow guide wires (not shown) extending in the guide pipe 220 to center body 300 therein without having any of the guide wires being disposed in a slot 360. Further, each slot 360 is curved having an elongated S-curve to create a vortex for the cooling/purge air which flows outside and inside the collimator body 300. The elongated S-curve slots 360 initiate cooling air turbulence past the lens 326 to maximize continuous cleaning of the lens 326 and eliminate or effectively reduce a pressure drop at the lens 326. Reduction of the pressure drop at the lens 326 results in elimination or effective reduction of dust deposits on the lens 326 over time, much like reducing dirt on a back window of an SUV or station wagon.

Since the collimator body 300 is cast (e.g., stainless steel) in exemplary embodiments, the slots 360 can be shaped to spin the cooling/purge air past the lens 326 to maximize cleaning of the lens 326. In exemplary embodiments as illustrated, the slots 360 are configured to create a more open area compared to prior art collimator bodies and to initiate air turbulence past the lens 326.

For example, but is not limited thereto, the plurality of slots 360 create a vortex with respect to cooling/purge airflow via a configuration of opposing first and second edges 370 and 372, respectively, defining each slot 360. A cross section portion of the collimator body 300 intermediate adjacent slots 360 resembles a trapezoid in which the first and second edges 370 and 372 define opposing sloping sides of the trapezoid.

Figure 12:
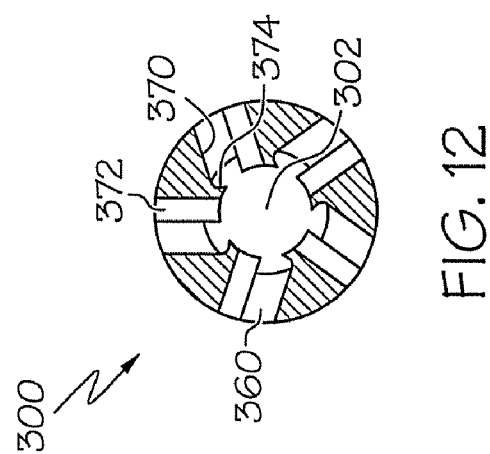
FIG. 12 is an enlarged cross section view of the collimator body taken along line C-C of FIG. 7.
Figure 11:
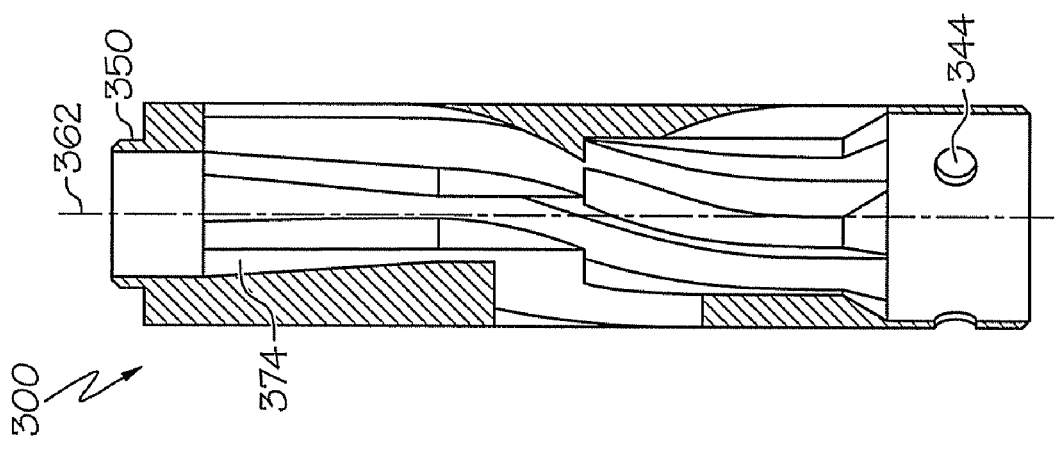
FIG. 11 is a cross section view of the collimator body taken along line A-A of FIG. 7.

In an exemplary embodiment as illustrated in FIGS. 7-9 and 11, a portion of the first edge 370 corresponding to the upper portion 366 of the slot 360 and a portion of the second edge 372 corresponding to the lower portion 364 of the slot 360 are tapered more inwardly or define a more acute angle compared to a remaining portion of the first and second edges 370 and 372. Further, in an exemplary embodiment as illustrated in section C-C in FIG. 12, the portion of the first edge 370 corresponding to the upper portion 366 of the slot 360 initially tapers inwardly toward the second edge 372 as the first edge 370 extends toward the longitudinal axis 362 and a remaining terminal portion 374 most proximate to the longitudinal axis 362 tapers outwardly substantially normal to an initial portion of the first edge 370 relative to an outer diameter defining the collimator body 300.

The above described design is both physically and visually novel in its approach to improve the performance level and longevity of the collimator as a critical element in flame scanning systems. The above described flame scanner collimator body is characterized by its (a) mechanically rugged design for increased protection of internal components; (b) reduced parts count for reduced assembly cost and easier maintenance; (c) reduced backpressure for improved cooling/purge airflow; and (d) spiral cooling/purge airflow guides to improve cleaning action on a lens barrel lens.

In summary, an exemplary embodiment of the collimator body allows the lens barrel assembly to be held in place with a spring. If tension occurs during operation, the spring allows tension release between the collimator body holding the lens barrel and fiber optic cable secured with the lens barrel, while the collimator body holds the lens barrel in its center position during pull back, therefore maintaining alignment to view burner flame activity. A single cast collimator body design allows more open area for reducing cooling/purge airflow backpressure at the lens, and increases flow to lower temperatures and improve reliability and longevity of the internal components. A single cast collimator body design also reduces the parts count therefore minimizing field maintenance time. For example, the exemplary collimator body integrates an end cap into the single piece cast design. Further, since the collimator body is of a cast design, cooling/purge air paths can be shaped to spin the air past the lens thus maximizing continuous cleaning of the lens.

It will be easily recognized by those skilled in the pertinent art that above described collimator body provides a customer with hardware more robust than the present day offering. Further, it is known that all hardware in the field environment where this equipment lives requires maintenance at one time or another. The new, novel configured exemplary collimator body is designed to give the customer more user-friendly hardware to disassemble and assemble when the occasion does arise requiring parts cleaning or replacement.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flame scanner collimator for monitoring flames produced by a fossil fuel fired combustion chamber, comprising:
   a substantially cylindrical collimator body defining a hollow portion;
   a first chamber connected to a second chamber, the first and second chambers defining the hollow portion, the second chamber having a larger diameter than the first chamber; and a plurality of slots each extending in substantially a same direction as a longitudinal axis defining the body, each slot extending therethrough the body including interior sidewalls of the body defining the first and second chambers to allow cooling/purge air flow therethrough.

2. The flame scanner collimator of claim 1, wherein each slot includes a lower portion which extends to an upper portion, the lower portion of each slot is disposed substantially on a right side of the longitudinal axis while the upper portion of each respective slot is disposed substantially on a left side of the longitudinal axis.

3. The flame scanner collimator of claim 2, wherein an interface between the lower and upper portions crosses over the longitudinal axis.

4. The flame scanner collimator of claim 3, wherein each of the plurality of slots is substantially parallel with one another and the plurality of slots circumvent a circumference defining the body.

5. The flame scanner collimator of claim 1, wherein each slot is curved having an elongated S-curve to create a vortex for cooling/purge air which flows outside and inside the collimator body, the elongated S-curve slots are configured to initiate air turbulence past a lens disposed in the collimator body.

6. The flame scanner collimator of claim 5, wherein the plurality of slots create the vortex with respect to the cooling/purge airflow via a configuration of opposing first and second edges defining each slot, and a cross section portion of the collimator body intermediate adjacent slots resembles a trapezoid in which the first and second edges define opposing sloping sides of the trapezoid, a portion of the first edge corresponding to an upper portion of the slot and a portion of the second edge corresponding to a lower portion of the slot define a more acute angle compared to a remaining portion of the first and second edges.

7. The flame scanner collimator of claim 6, wherein the portion of the first edge corresponding to the upper portion of the slot initially tapers inwardly toward the second edge as the first edge extends toward the longitudinal axis, and a remaining terminal portion most proximate to the longitudinal axis tapers outwardly substantially normal to an initial portion of the first edge relative to an outer diameter defining the collimator body.

8. The flame scanner collimator of claim 1, wherein the first chamber is configured having a diameter slightly larger than a diameter of the outside diameter of a lens barrel assembly to allow slidable translation of the lens barrel assembly therethrough while maintaining alignment of the lens barrel assembly relative to the collimator body.

9. The flame scanner collimator of claim 8, wherein the first chamber diameter increases toward an end of the collimator body providing a tapered diameter of the first chamber as the first chamber extends toward the end of the collimator body having a guide cylinder thereat, and a remaining portion of the first chamber acts as a lens barrel guide for continued lens barrel sighting alignment during translation of the lens barrel assembly relative to the collimator body.

10. The flame scanner collimator of claim 1, wherein the collimator body integrates an end cap having a guide cylinder to be received in a corresponding guide pipe as a unitary indivisible part.

11. The flame scanner collimator of claim 10, wherein the collimator body is cast of stainless steel.

12. A flame scanner collimator for monitoring flames produced by a fossil fuel fired combustion chamber, comprising:
a substantially cylindrical collimator body defining a hollow portion;
a first chamber connected to a second chamber, the first and second chambers defining the hollow portion, the second chamber having a larger diameter than the first chamber;
a lens barrel assembly slidably disposed in the first chamber of the collimator body; and
a biasing member disposed in the second chamber biasing the lens barrel assembly away from the second chamber and allowing translation of the lens barrel assembly in the first chamber.

13. The flame scanner collimator of claim 12, further comprising:
a fiber optic cable having a first end and an opposite second end, the first end disposed in one end of the lens barrel assembly engaging corresponding threads thereon;
a flat washer slidably disposed within the second chamber and abutting the one end of the lens barrel assembly, the flat washer having the threaded first end of the fiber optic cable extending therethrough; and a threaded locknut threaded onto the threads of the first end of the fiber optic cable to lock the flat washer against the lens barrel assembly.

14. The flame scanner collimator of claim 13, wherein the flat washer includes an outside diameter which is larger than a diameter of the first chamber, larger than a diameter of the biasing member, and smaller than a diameter of the second chamber.

15. The flame scanner collimator of claim 14, wherein the biasing member is a compression spring.

16. The flame scanner collimator of claim 15, further comprising:
a lock washer intermediate the flat washer and the locknut.

17. The flame scanner collimator of claim 15, wherein the spring is disposed in the second chamber having one end of the spring abutting the flat washer and an opposite end of the spring abutting an NPT adapter, the NPT adapter retains the spring in the second chamber, the spring compresses the lens barrel assembly away from the NPT adapter secured in the second chamber of the collimator body.

18. The flame scanner collimator of claim 17, wherein the NPT adapter is secured in the second chamber of the collimator body via set screws received through corresponding apertures configured in the collimator body and threaded into respective threaded holes in the NPT adapter.

19. The flame scanner collimator of claim 18, wherein one end of the NPT adapter includes a threaded portion which receives the fiber optic cable therethrough and a corresponding threaded end of a flame scanner assembly.

20. The flame scanner collimator of claim 12, further comprising:
a plurality of slots each extending in substantially a same direction as a longitudinal axis defining the body, each slot extending therethrough the body including interior sidewalls of the body defining the first and second chambers to allow cooling/purge airflow therethrough.

* * * * *

UNITED STATES PATENT AND TRADEMARK OFFICE
CERTIFICATE OF CORRECTION

PATENT NO. : 7,777,977 B2  Page 1 of 1
APPLICATION NO. : 12/033542
DATED : August 17, 2010
INVENTOR(S) : Chase et al.

It is certified that error appears in the above-identified patent and that said Letters Patent is hereby corrected as shown below:

In column 3, line 17, delete "B-B" and insert -- 10-10 --, therefore.

In column 3, line 19, delete "A-A" and insert -- 11-11 --, therefore.

In column 3, line 21, delete "C-C" and insert -- 12-12 --, therefore.

Signed and Sealed this
Eleventh Day of January, 2011

David J. Kappos
*Director of the United States Patent and Trademark Office*